US012668188B2

(12) United States Patent
Ghannam et al.

(10) Patent No.: US 12,668,188 B2
(45) Date of Patent: Jun. 30, 2026

(54) SYSTEMS AND METHODS FOR CLEANING DIRTY ARTICLES IN VEHICLES

(71) Applicant: Ford Global Technologies, LLC, Dearborn, MI (US)

(72) Inventors: Mahmoud Yousef Ghannam, Canton, MI (US); Aed M. Dudar, Canton, MI (US); Oliver Lei, Windsor (CA); Somak Datta Gupta, Novi, MI (US)

( * ) Notice: Subject to any disclaimer, the term of this patent is extended or adjusted under 35 U.S.C. 154(b) by 428 days.

(21) Appl. No.: 18/507,461

(22) Filed: Nov. 13, 2023

(65) Prior Publication Data

US 2025/0153645 A1 May 15, 2025

(51) Int. Cl.
| | |
|---|---|
| *B60R 3/00* | (2006.01) |
| *A47L 23/26* | (2006.01) |
| *B60Q 1/32* | (2006.01) |
| *B60S 1/66* | (2006.01) |

(52) U.S. Cl.
CPC ............ *B60R 3/002* (2013.01); *A47L 23/266* (2013.01); *B60Q 1/325* (2022.05); *B60S 1/66* (2013.01)

(58) Field of Classification Search
CPC ...... B60R 3/002; A47L 23/266; A47L 23/263; B60Q 1/325; B60S 1/66; B08B 5/04
See application file for complete search history.

(56) References Cited

U.S. PATENT DOCUMENTS

| | | | | |
|---|---|---|---|---|
| 8,851,494 | B1 * | 10/2014 | Strang | B60R 3/002 280/163 |
| 2005/0263975 | A1 * | 12/2005 | Mulder | B60R 3/04 280/163 |

| | | | | |
|---|---|---|---|---|
| 2016/0229460 | A1 * | 8/2016 | Kowalk | B60S 1/66 |
| 2017/0210353 | A1 | 7/2017 | Stauffer et al. | |
| 2018/0312142 | A1 * | 11/2018 | Walter | B61D 23/025 |
| 2019/0061703 | A1 * | 2/2019 | Carroll | B05B 9/04 |
| 2019/0126833 | A1 * | 5/2019 | Wymore | B60R 3/002 |

(Continued)

FOREIGN PATENT DOCUMENTS

| | | | | |
|---|---|---|---|---|
| CN | 112971685 | A | 6/2021 | |
| CN | 119283774 | A * | 1/2025 | B60R 3/002 |

(Continued)

OTHER PUBLICATIONS

Scholtes, Running Board Arrangement With Cleaning Function For A Vehicle, Nov. 2, 2023, EPO, DE 102022004883 A1, Machine Translation of Description (Year: 2023).*

(Continued)

*Primary Examiner* — John Olszewski
*Assistant Examiner* — Matthew D Lee
(74) *Attorney, Agent, or Firm* — Frank Lollo; Eversheds Sutherland (US) LLP

(57) ABSTRACT

A vehicle including a mat, an air flow unit and a processor is disclosed. The mat may include a top wall, a bottom wall and plurality of through-holes disposed in the top wall. The air flow unit may be configured to blow pressurized air in a mat interior portion. The processor may detect a trigger event, and cause the air flow unit to blow the pressurized air in the mat interior portion responsive to detecting the trigger event. The ambient air in proximity to the top wall may be pulled towards the mat interior portion via the plurality of through-holes when the air flow unit blows the pressurized air in the mat interior portion.

20 Claims, 5 Drawing Sheets

(56)            References Cited

U.S. PATENT DOCUMENTS

| | | | |
|---|---|---|---|
| 2019/0263361 A1* | 8/2019 | Carroll | H05B 3/36 |
| 2020/0022225 A1* | 1/2020 | Dellock | B60R 3/002 |
| 2020/0139938 A1* | 5/2020 | DePascale | A46B 13/06 |
| 2021/0347336 A1* | 11/2021 | Williams | B60R 19/48 |
| 2023/0218138 A1* | 7/2023 | Lam | A47L 23/26 |
| | | | 36/88 |
| 2023/0240489 A1 | 8/2023 | Khazaieli et al. | |
| 2024/0217486 A1* | 7/2024 | McCabe | F01N 13/002 |
| 2025/0256685 A1* | 8/2025 | Perez | E04D 13/0762 |

FOREIGN PATENT DOCUMENTS

| | | | | |
|---|---|---|---|---|
| DE | 102023000934 A1 | 5/2023 | | |
| DE | 102022004883 A1 * | 11/2023 | | B60S 1/66 |
| KR | 100815864 B1 * | 3/2008 | | B60S 1/66 |
| KR | 101913389 B1 | 10/2018 | | |

OTHER PUBLICATIONS

Young Kim, Shoe Bottom Cleaner for Automobile Riders, https://contest.techbriefs.com/2013/entries/consumer-products/3326, May 22, 2013, pp. 1-2.

* cited by examiner

SYSTEMS AND METHODS FOR CLEANING DIRTY ARTICLES IN VEHICLES

FIELD

The present disclosure relates to systems and methods for cleaning dirty articles in vehicles and more particularly to systems and methods for cleaning user shoes before the user enters the vehicle.

BACKGROUND

When a user performs outdoor activities, the user's shoes may get dirty. In such scenarios, the user's vehicle may get dirty if the user enters the vehicle with the dirty shoes. Dust, sand, and debris from the shoes may enter the vehicle's duct system, which may affect the vehicle's performance. Further, the debris from the shoes may cause the vehicle's sitting areas, floor, etc. to get dirty.

Many users clean their shoes manually before entering vehicles, e.g., by rubbing the shoes against each other or against a surface. Such methods are not effective and are cumbersome for the users to implement.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
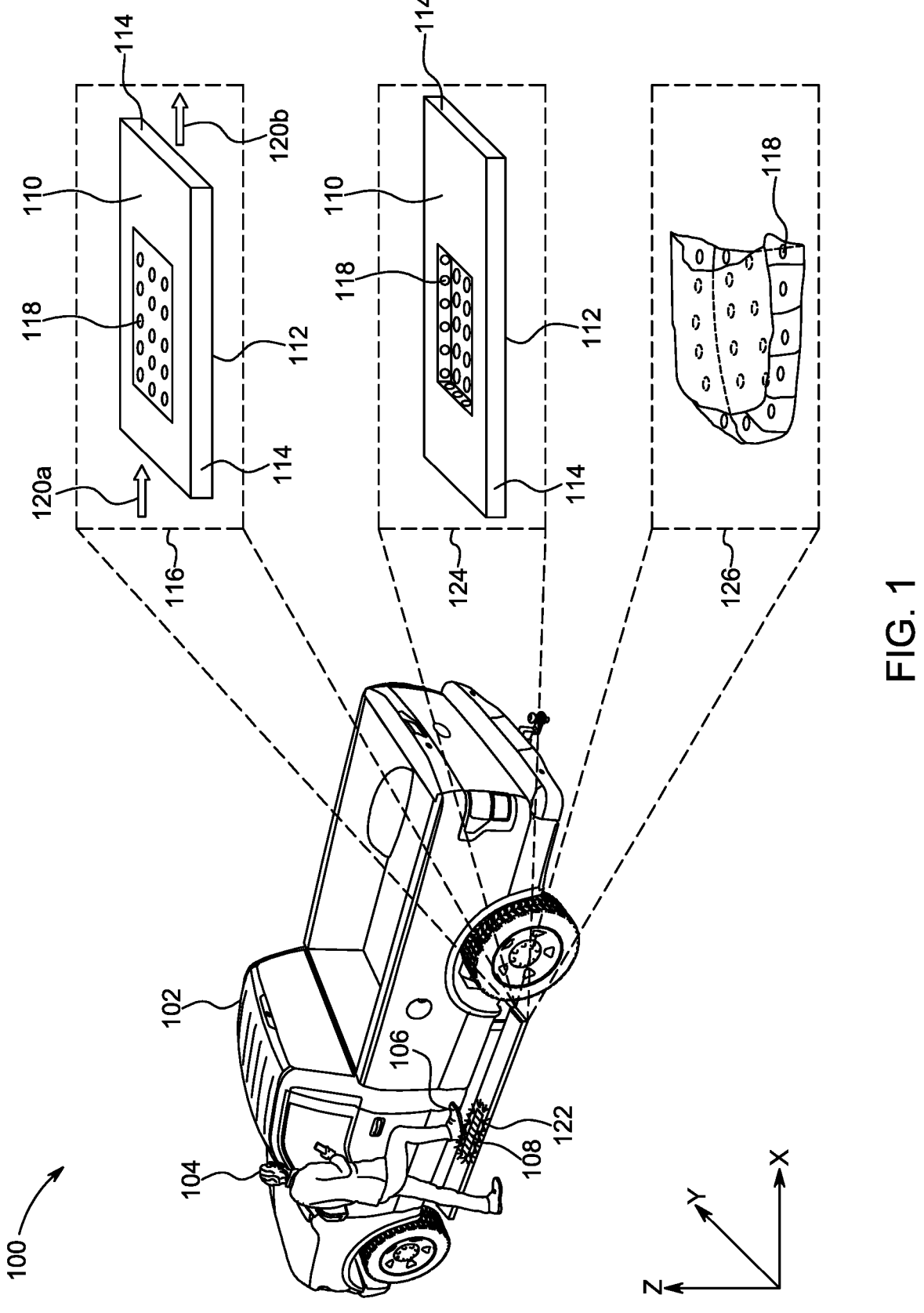
FIG. 1 depicts an environment in which techniques and structures for providing the systems and methods disclosed herein may be implemented.

The present disclosure describes a vehicle including a mat that may enable cleaning of one or more objects, e.g., shoes, when a user stands on the mat wearing the shoes. The mat may be disposed in a vehicle interior portion or a vehicle exterior portion. For example, the mat may be disposed on a vehicle step bar, a bumper, a cargo bed, and/or the like. The mat may have a hollow interior portion and may include a plurality of through-holes disposed on a mat top wall. The vehicle may further include an air flow unit that may be configured to blow pressurized air into a mat interior portion along a mat length. For example, the air flow unit may blow the pressurized air from a mat left edge into the mat interior portion and cause the pressurized air to flow from the mat left edge towards a mat right edge, from where the pressurized air may exit from the mat interior portion. In some aspects, the plurality of through-holes may act as Venturi vacuum generators that may draw or pull ambient air disposed above the top wall, when the pressurized air is made to blow along the mat length underneath the top wall.

In some aspects, the vehicle may activate the air flow unit and cause the pressurized air to blow underneath the top wall, when the vehicle detects that the shoes may be placed on the mat. Responsive to causing the pressurized air to blow underneath the top wall, the ambient air above the top wall may get drawn into the mat interior portion via the plurality of through-holes due to Venturi effect. The ambient air that gets drawn into the mat interior portion via the plurality of through-holes may bring in the debris, dust, sand, etc. that may be disposed on the shoes into the mat interior portion, thereby cleaning the shoes. The debris, dust, sand, etc. may then exit from the mat interior portion via the mat right edge due to the force of the pressurized air flowing from the mat left edge to the mat right edge.

In further aspects, the vehicle may enable the mat to self-clean, e.g., when one or more through-holes may get clogged. To enable the mat to self-clean, the vehicle may activate the air flow unit to blow the pressurized air in the mat interior portion via the mat left edge. The vehicle may further block the flow of pressurized air from the mat right edge, thereby causing the pressurized air to exit the mat interior portion via the plurality of through-holes. The through-holes may get unclogged (and hence the mat may clean itself) when the pressurized air exits from the plurality of through-holes.

The vehicle may further include a light unit that may be disposed in proximity to or on the mat. The vehicle may illuminate the light unit when the vehicle determines that the user may be approaching the vehicle. The illuminated light unit may indicate to the user that the user should clean the shoes by using the mat before entering the vehicle. The illuminated light unit may further enable the user to conveniently locate the mat in the vehicle exterior portion.

The present disclosure discloses a vehicle including an object cleaning mat. The mat may enable the user to clean the shoes before entering the vehicle, thereby ensuring that the vehicle is kept clean and hygienic. Further, the vehicle uses existing vehicle air flow unit to enable shoe cleaning by the mat, thereby eliminating the need of any complex external hardware. The mat may further self-clean when the mat through-holes may be clogged, thereby enhancing the convenience of operating the mat.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may be located outdoors, e.g., on a field, a road, a lawn, etc. The vehicle 102 may take the form of any passenger or commercial vehicle such as, for example, a car, a work vehicle, a crossover vehicle, a van, a minivan, etc. Further, the vehicle 102 may be a manually driven vehicle and/or may be configured to operate in a fully autonomous (e.g., driverless) mode or a partially autonomous mode and may include any powertrain such as, for example, a gasoline engine, one or more electrically-actuated motor(s), a hybrid system, etc.

The environment 100 may further include a user 104 who may be performing outdoor activities. The user 104 may be wearing shoes 106 that may be dirty or soiled due to the outdoor activities. In some aspects, the vehicle 102 may include an air matrix or a mat 108 that may be configured to facilitate cleaning of an object placed on the mat 108. For example, the mat 108 may facilitate cleaning of the shoes 106 before the user 104 enters the vehicle 102. In some aspects, the mat 108 may facilitate shoe cleaning by pulling/sucking debris, dust, sand, etc. from the shoes 106 and outputting the debris to ambient environment (or a trash bag). The process of drawing debris from the shoes 106 is described later in detail in the description below.

The user 104 may cause the mat 108 to clean the shoes 106 by placing the shoes 106 on the mat 108, or by standing on the mat 108 wearing the shoes 106. The user 104 may enter the vehicle 102 when the shoes 106 may be cleaned by the mat 108. In this manner, the mat 108 facilities in keeping the vehicle's interior portion clean and healthy, even when the user 104 may be performing outdoor activities that typically results in dirty/soiled shoes.

Although a single mat 108 is shown in FIG. 1, the vehicle 102 may include more than one mat, without departing from the present disclosure scope. In some aspects, the mat 108 may be disposed in a vehicle exterior portion. For example, the mat 108 may be disposed at a vehicle step bar (as shown in FIG. 1), a bumper (e.g., a rear bumper), a cargo bed, a rocker, and/or the like. In additional aspects, one or more mats may be disposed in the vehicle interior portion (not shown).

In an exemplary aspect, the mat 108 may be shaped as a cuboid with a top wall 110, a bottom wall 112 and sidewalls 114, as shown in a view 116 of FIG. 1. Dimensions of the top and bottom walls 110, 112 and the sidewalls 114 may depend on vehicle dimensions and typical shoe dimensions. In some aspects, the mat walls may be sized such that the user 104 may conveniently place the shoes 106 on the mat 108 or stand on the mat 108, with the shoe contours being within the mat edges. The top and bottom walls 110, 112 and the sidewalls 114 may be made of rubber, plastic, or any other flexible material. In some aspects, the top wall 110 may include structural geometrical ribs to provide strength and stability. Further, the mat 108 may be lightweight. Furthermore, a mat interior portion or a mat body may be hollow.

The top wall 110 may include a plurality of through-holes 118 that may act as Venturi vacuum generators when pressurized air may be caused to blow through the mat interior portion and exit from one of the sidewalls 114 or the bottom wall 112. In some aspects, the vehicle 102 may include an air flow unit (shown as air flow unit 240 in FIG. 2) that may be configured to blow pressurized air in the mat interior portion underneath the top wall 110. In an exemplary aspect, the air flow unit blows the pressurized air parallel to an X-Y plane (shown in FIG. 1) of the mat 108, e.g., along a mat length. As an example, the air flow unit may blow the pressurized air from a mat left edge towards the mat interior portion, and the pressurized air may exit the mat interior portion into ambient environment via a mat right edge, as shown by arrows 120a and 120b in FIG. 1.

When the pressurized air blows through the mat interior portion as described above, ambient air in proximity to the top wall 110 may be pulled towards the hollow mat interior portion via the plurality of through-holes 118 due to Venturi effect. Due to the pulling of the ambient air from the top wall 110, debris, dust, sand, etc. that may be disposed on the shoes 106 may be sucked into the hollow mat interior portion and made to exit the mat interior portion via the mat right edge due to the movement of the pressurized air, when the shoes 106 may be placed on the top wall 110. In this manner, the mat 108 may facilitate shoe cleaning by drawing/sucking the debris off the shoes 106 when the shoes 106 may be placed on the mat 108.

When blowing pressurized air outside through the plurality of through-holes 118 (as opposed to sucking the ambient air into the mat interior portion), a flow of pressurized air to the ambient environment via the mat right edge may be blocked. In this case, the pressurized air that enters the mat interior portion via the mat left edge may exit to the ambient environment via the plurality of through-holes 118, thereby blowing the pressurized air out through the top wall 110. In an exemplary aspect, the flow of pressurized air to the ambient environment via the mat right edge may be blocked when the mat 108 may need cleaning and/or one or more through-holes, from the plurality of through-holes 118, may be clogged.

Figure 2:
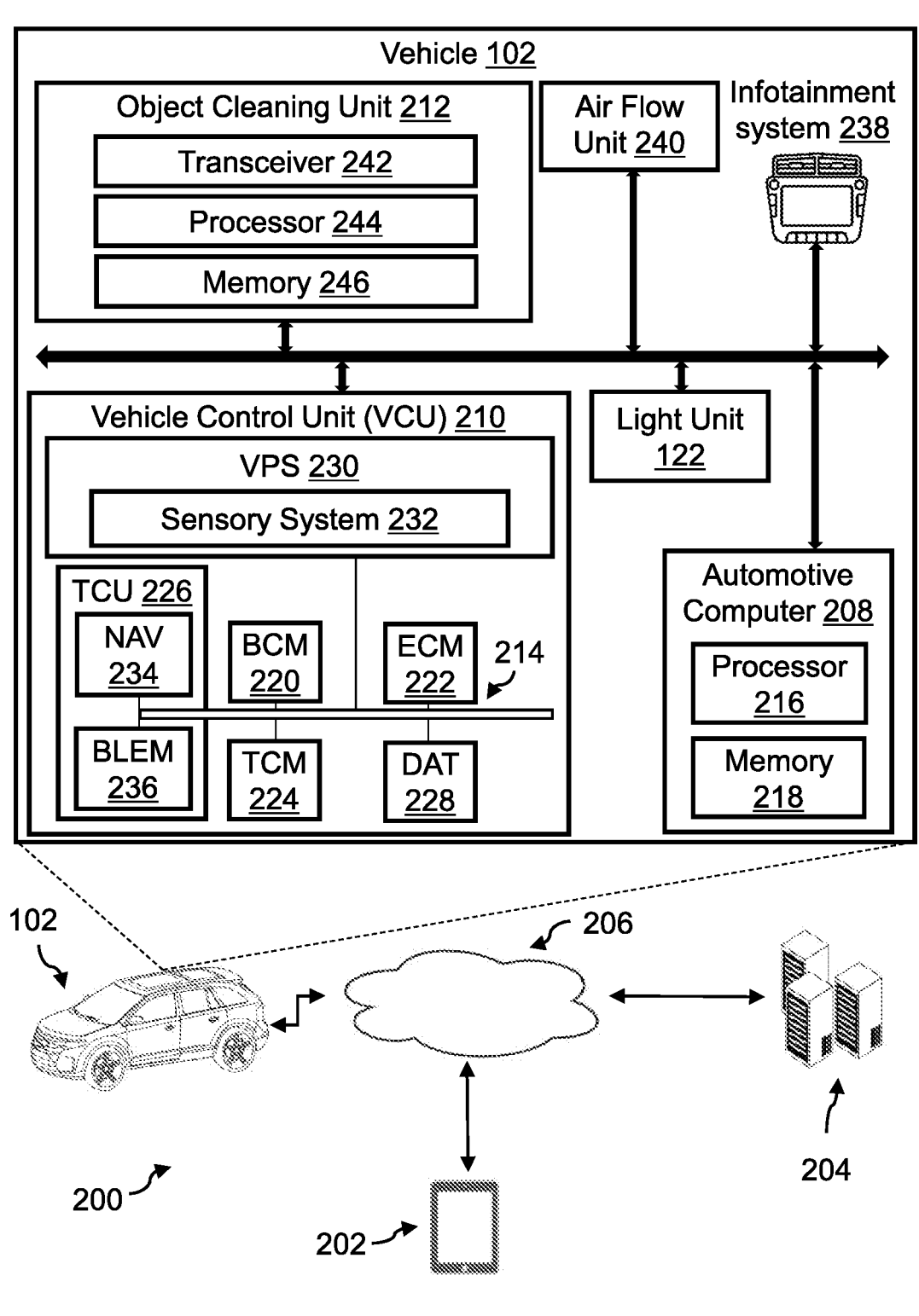
FIG. 2 depicts a block diagram of an object cleaning system in accordance with the present disclosure.

In some aspects, the vehicle 102 may be configured to automatically control an air flow unit operation and/or the flow of pressurized air into the mat interior portion or outside based on commands received from the user 104 and/or inputs received from a vehicle sensor unit (shown as vehicle sensory system 232 in FIG. 2). For example, the vehicle 102 may automatically activate the air flow unit and cause the pressurized air to flow into the mat interior portion via the mat left edge and exit via the mat right edge, when the vehicle 102 detects that the shoes 106 may be placed on the mat 108 based on the inputs obtained from the vehicle sensor unit. As another example, the vehicle 102 may block the flow of pressurized air to the ambient environment via the mat right edge when the vehicle 102 receives a command from the user 104 to clean the mat 108, or when the vehicle 102 itself determines that one or more through-holes 118 may be clogged based on the inputs obtained from the vehicle sensor unit.

The vehicle 102 may further include a light unit 122 that may be disposed in proximity to or on the mat 108. In an exemplary aspect, the light unit 122 may include a plurality of light emitting diodes (LEDs) that may surround the mat 108. In another aspect, the LEDs may be shaped as a shoe. The vehicle 102 may automatically illuminate the light unit 122 when the vehicle 102 detects that the user 104 may be located in proximity to the vehicle 102, determined based on the inputs obtained from the vehicle sensor unit. The illuminated light unit 122 may provide an indication to the user 104 to place the shoes 106 on the mat 108 before entering the vehicle 102, thereby enabling the vehicle 102 to be kept clean. In addition, the illuminated light unit 122 may enable the user 104 to conveniently locate the mat 108 in the vehicle exterior portion (or the vehicle interior portion if the mat 108 is disposed in the vehicle interior portion).

Although the description above describes an aspect where the mat 108 includes the plurality of through-holes 118 in the top wall 110, the present disclosure is not limited to such an aspect. In another aspect, as shown in a view 124 of FIG. 1, the mat 108 may include an opening, and the plurality of through-holes 118 may be disposed on the bottom and side surfaces of the opening. The operation of the mat 108 shown in the view 124 may be similar to the operation of the mat 108 shown in the view 116 (described above). In yet another aspect, the mat 108 may have a slide-in cavity design (as shown in view 126) into which the user 104 may insert the shoe 106. In this case also, the plurality of through-holes 118 may be disposed on the bottom and side surfaces of the cavity, and the operation of the mat 108 shown in the view 126 may be similar to the operation of the mat 108 shown in the view 116 (described above).

Further vehicle details are described below in conjunction with FIG. 2.

Although the description above is described in the context of the mat 108 cleaning the shoes 106, the present disclosure is not limited to such an aspect. The user 104 may additionally use the mat 108 to clean dirty equipment/tools, clothing items or towels, car mats, luggage, and/or the like, without departing from the present disclosure scope.

The vehicle 102 implements and/or performs operations, as described here in the present disclosure, in accordance with the owner manual and safety guidelines. In addition, any action taken by the user 104 based on the notifications provided by the vehicle 102 should comply with all the rules specific to the location and operation of the vehicle 102 (e.g., Federal, state, country, city, etc.). The notifications, as provided by the vehicle 102, should be treated as suggestions and only followed according to any rules specific to the location and operation of the vehicle 102.

FIG. 2 depicts a block diagram of an object cleaning system 200 in accordance with the present disclosure. While describing FIG. 2, references will be made to FIGS. 3 and 4.

The system 200 may include the vehicle 102, a user device 202, and one or more servers 204 (or server 204) communicatively coupled with each other via one or more networks 206 (or a network 206). The user device 202 may be associated with the user 104 and may be, for example, a mobile phone, a laptop, a computer, a tablet, a wearable device, or any other similar device with communication capabilities. The server 204 may be part of a cloud-based computing infrastructure and may be associated with and/or include a Telematics Service Delivery Network (SDN) that provides digital data services to the vehicle 102 and other vehicles (not shown) that may be part of a vehicle fleet. In further aspects, the server 204 may be configured to transmit weather condition information associated with a geographical area where the vehicle 102 may be located to the vehicle 102 via the network 206. The server 204 may transmit the weather condition information to the vehicle 102 at a predefined frequency, or when the vehicle 102 transmits a request to the server 204 to obtain the weather condition information.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and an object cleaning unit 212 (or unit 212). The VCU 210 may include a plurality of Electronic Control Units (ECUs) 214 disposed in communication with the automotive computer 208.

In some aspects, the user device 202 may be configured to connect with the automotive computer 208 and/or the unit 212 via the network 206, which may communicate via one or more wireless connection(s), and/or may connect with the vehicle 102 directly by using near field communication (NFC) protocols, Bluetooth® protocols, Wi-Fi, Ultra-Wide Band (UWB), and other possible data connection and sharing techniques.

The automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable storage medium or memory storing an object cleaning program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (e.g., the server 204), and other vehicles (not shown in FIG. 2) operating as part of a vehicle fleet. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or a vehicle sensor unit). The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, a vehicle accelerometer, a vehicle gyroscope, a vehicle magnetometer, ultrasonic sensors, etc. The vehicle sensory system 232 may be configured to detect a presence of a user (e.g., the user 104) in proximity to the vehicle 102, a presence of an object (e.g., the shoes 106) on the top wall 110 of the mat 108, an amount of debris disposed on the object/shoes 106, a geographical area condition associated with a geographical area where the vehicle 102 may be located, and/or the like. The vehicle sensory system 232 may be further configured to transmit sensor inputs to the unit 212 at a predefined frequency.

In some aspects, the VCU 210 may control vehicle operational aspects and implement one or more instruction sets received from the server 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE® Module (BLEM) 236, a Wi-Fi transceiver, an ultra-wideband (UWB) transceiver, and/or other wireless transceivers (not shown in FIG. 2) that may be configurable for wireless communication (including cellular communication) between the vehicle 102 and other systems (e.g., a vehicle key fob, not shown in FIG. 2, the server 204, the user device 202, etc.), computers, and modules. The TCU 226 may be disposed in communication with the ECUs 214 by way of a bus.

The ECUs 214 may control aspects of vehicle operation and communication using inputs from human drivers, inputs from the automotive computer 208, the unit 212, and/or via wireless signal inputs/command signals received via the wireless connection(s) from other connected devices, such as the server 204, the user device 202, among others.

The BCM 220 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2). In some aspects, the BCM 220 may be configured to control illumination of the light unit 122 and/or control operations of an air flow unit and one or more valves (described below) associated with the vehicle 102, based on the command signals obtained from the unit 212 and/or the user device 202.

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion and/or output or display notifications, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered as limiting or exclusive.

The vehicle 102 may further include an air flow unit 240, the light unit 122, the mat 108, and one or more valves that may be configured to enable or disable a flow of pressurized air from the air flow unit 240 to the mat 108 and/or to the ambient environment. In some aspects, the air flow unit 240 may be part of a vehicle turbocharger system (e.g., a conventional or an existing vehicle turbocharger system) and may be, for example, an eBooster unit. Example views of a vehicle turbocharger system connected with the mat 108 are depicted in FIGS. 3 and 4.

Figure 3:
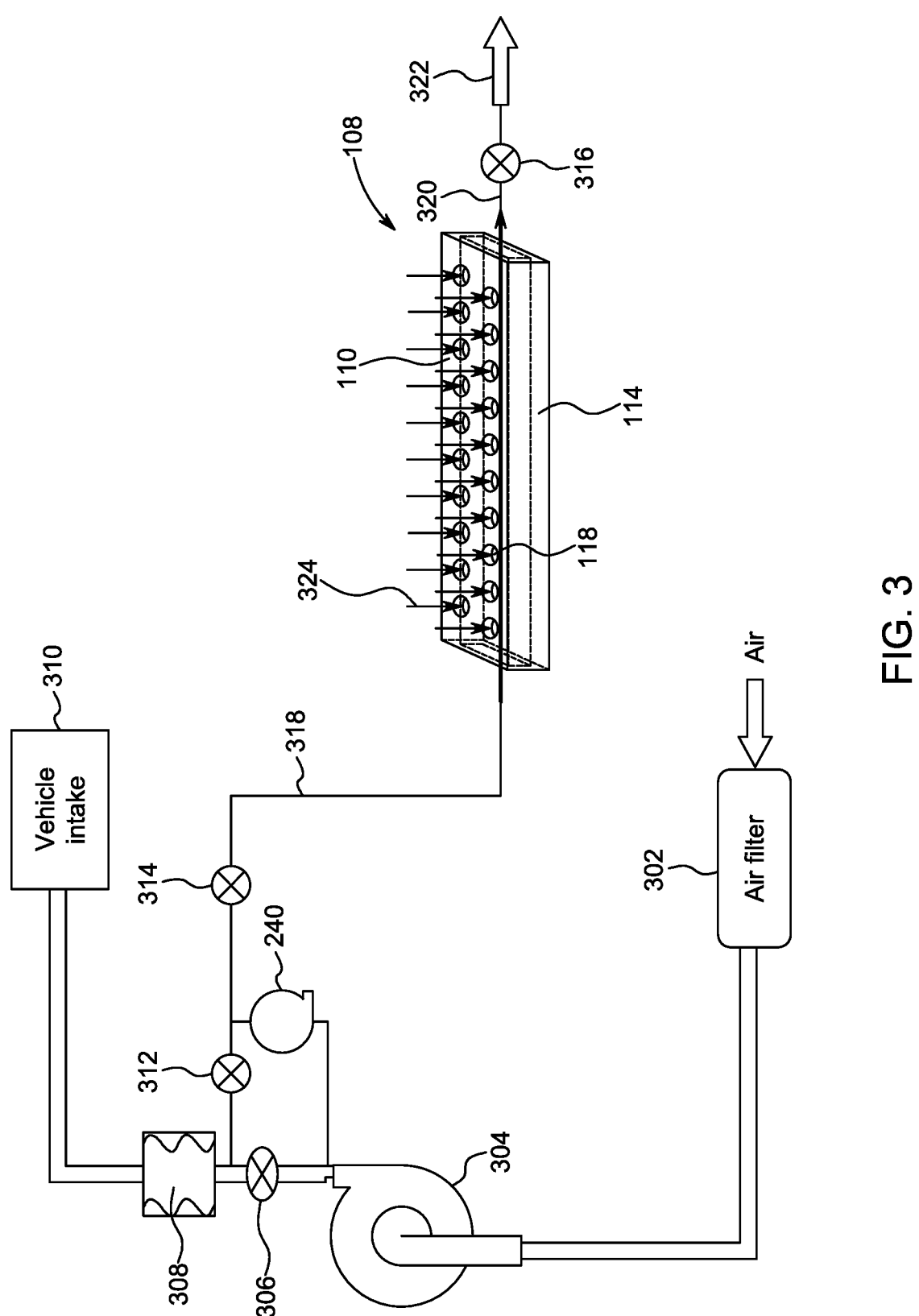
FIG. 3 depicts a first view of a vehicle air flow unit connected with a mat in accordance with the present disclosure.
Figure 4:
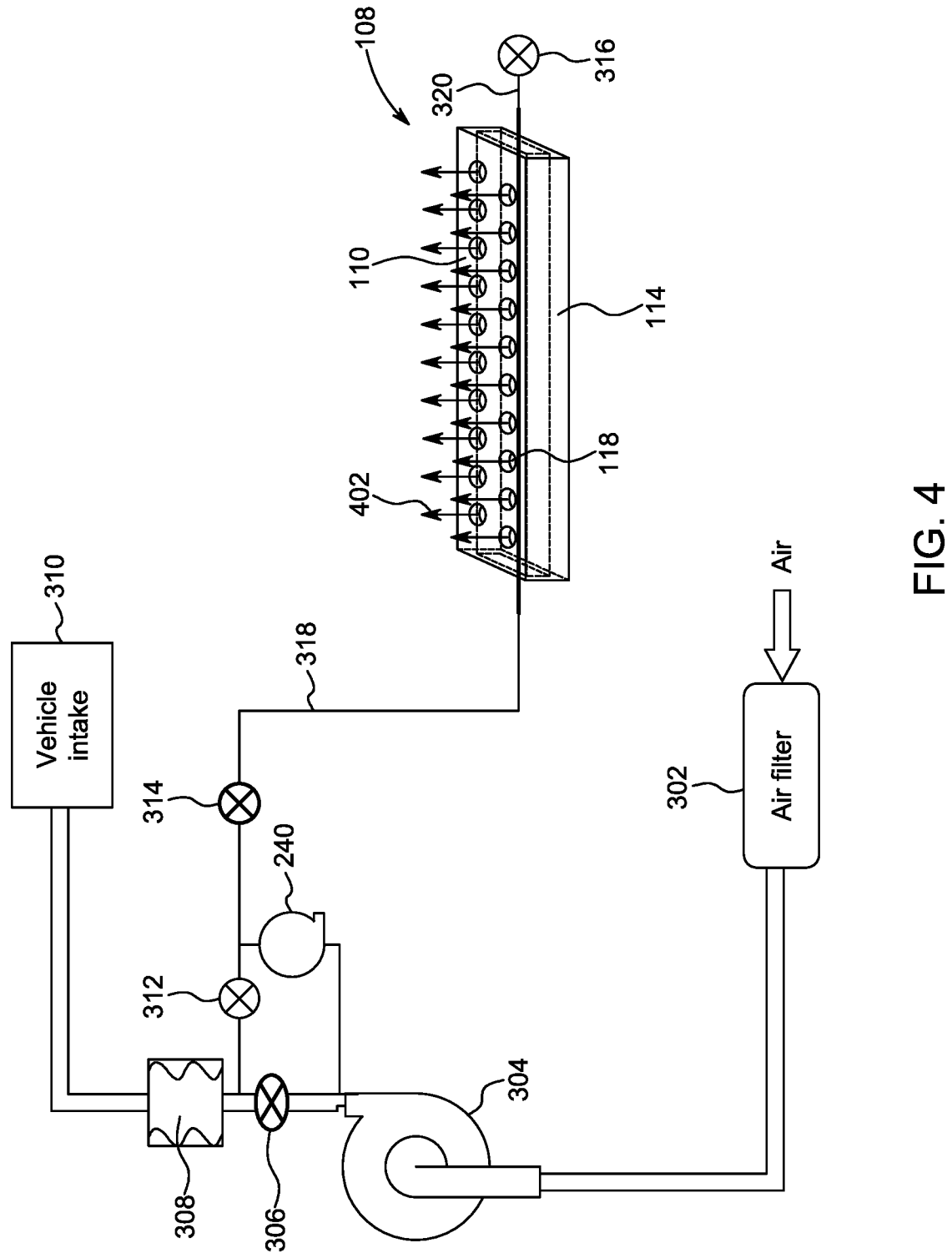
FIG. 4 depicts a second view of a vehicle air flow unit connected with a mat in accordance with the present disclosure.

As shown in FIGS. 3 and 4, the vehicle turbocharger system may include an air filter 302, a mechanical turbo 304, a bypass compressor 306, an air cooler 308, a vehicle intake manifold 310 and the air flow unit 240. A person ordinarily skilled in the art may appreciate that during vehicle movement or when the vehicle 102 needs thrust, air may be pulled into the vehicle turbocharger system by the mechanical turbo 304 via the air filter 302 (e.g., by using waste heat) and/or the air flow unit 240 (e.g., by using vehicle battery energy). The pulled air may be compressed by the compressor 306 and cooled by the air cooler 308, before being fed into the vehicle intake manifold 310 to provide thrust to the vehicle 102. Since the operation of the vehicle turbocharger system is known in the art, it is not described here in detail.

In some aspects, the vehicle 102 may further include a first valve 312, a second valve 314, a third valve 316, a pneumatic tube 318 and an exhaust tube 320, as shown in FIGS. 3 and 4. The pneumatic tube 318 may connect the air flow unit 240 with the mat interior portion (e.g., via the mat left end/edge) and may be configured to transfer the pressurized air from the air flow unit 240 to the mat interior portion such that the pressurized air may blow parallel to the mat plane. The second valve 314 may be disposed on the pneumatic tube 318 between the air flow unit 240 and the mat interior portion, as shown in FIGS. 3 and 4. The second valve 314 may be configured to move between an open position and a closed position. In some aspects, the second valve 314 may enable the flow of pressurized air from the air flow unit 240 to the mat interior portion when the second valve 314 may be in the open position and may disable the flow of pressurized air from the air flow unit 240 to the mat interior portion when the second valve 314 may be in the closed position.

Similar to the second valve 314, the first valve 312 may also be configured to move between an open position and a closed position. The first valve 312 may enable the flow of pressurized air from the air flow unit 240 to the vehicle intake manifold 310 (via the air cooler 308) when the first valve 312 may be in the open position and may disable the flow of pressurized air from the air flow unit 240 to the vehicle intake manifold 310 when the first valve 312 may be in the closed position.

The exhaust tube 320 may be connected to the mat interior portion, e.g., at an end/edge of the mat 108 that may be opposite to the mat end/edge that may be attached to the pneumatic tube 318. As an example, the exhaust tube 320 may be attached to the mat right end/edge, as shown in FIGS. 3 and 4. In some aspects, the exhaust tube 320 may be part of the pneumatic tube 318. In other aspects, the exhaust tube 320 may be different from the pneumatic tube 318. The exhaust tube 320 may be configured to exhaust or output the pressurized air received from the mat interior portion (that the mat interior portion receives from the air flow unit 240) to ambient environment.

In some aspects, the third valve 316 may be disposed on the exhaust tube 320 and configured to move between an open position and a closed position. The third valve 316 may enable the exhaust tube 320 to output the pressurized air from the mat interior portion to the ambient environment when the third valve 316 may be in the open position and may disable the exhaust of the pressurized air from the exhaust tube 320 to the ambient environment when the third valve 316 may be in the closed position. In some aspects, the pressurized air may escape or output from the mat interior portion to the ambient environment via the plurality of through-holes 118 when the third valve 316 may be in the closed position.

As described above, the vehicle 102 may further include the unit 212. In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 242, a processor 244, and a computer-readable memory 246.

The transceiver 242 may be configured to receive information/inputs from one or more external devices or systems, e.g., the user device 202, the server 204, and/or the like, via the network 206. Further, the transceiver 242 may transmit notifications, requests, signals, etc. to the external devices or systems. In addition, the transceiver 242 may be configured to receive information/inputs from vehicle components such as the VCU 210. Further, the transceiver 242 may transmit signals (e.g., command signals) or notifications to the vehicle components such as the BCM 220, the infotainment system 238, and/or the like.

The processor 244 and the memory 246 may be same as or similar to the processor 216 and the memory 218, respectively. In some aspects, the processor 244 may utilize the memory 246 to store programs in code and/or to store data for performing aspects in accordance with the disclosure. The memory 246 may be a non-transitory computer-readable storage medium or memory storing the object cleaning program code.

In operation, when the user 104 may be approaching the vehicle 102 (or be in proximity to the mat 108), the vehicle sensory system 232 may detect the presence of the user 104 in proximity to the vehicle 102. The processor 244 may obtain the inputs from the vehicle sensory system 232 and may determine a user presence in proximity to the vehicle 102 based on the inputs obtained from the vehicle sensory system 232. Responsive to determining the user presence in proximity to the vehicle 102, the processor 244 may transmit a command signal to the BCM 220 and cause the light unit 122 to illuminate via the BCM 220. As described above in conjunction with FIG. 1, the illuminated light unit may provide an indication to the user 104 that the user 104 should clean the shoes 106 before entering the vehicle 102. The illuminated light unit may also facilitate the user 104 to locate the mat 108 in the vehicle exterior portion.

When the user 104 stands on the mat 108 (specifically on the top wall 110) wearing the shoes 106 or places the shoes 106 on the top wall 110 to clean the shoes 106, the vehicle sensory system 232 may detect the presence of an object (e.g., the shoes 106) on the top wall 110. The processor 244 may obtain the inputs from the vehicle sensory system 232 and may determine an object presence on the top wall 110 based on the inputs obtained from the vehicle sensory system 232. In some aspects, the processor 244 may determines that a trigger event may have happened when the processor 244 determines the object presence on the top wall

110. The trigger event may indicate to the processor 244 that the user 104 may desire the mat 108 to clean the object (i.e., the shoes 106) placed on the top wall 110.

Although the description above describes an aspect where the processor 244 determines that the trigger event may have happened when the processor 244 determines the object presence on the top wall 110, the present disclosure is not limited to such an aspect. In additional or alternative aspects, the processor 244 may determine that the trigger event may have happened when the processor 244 obtains a command signal or a request from the user 104 to clean the shoes 106 by using the mat 108. In some aspects, the user 104 may transmit the command signal or the request to the transceiver 242 via the user device 202, the infotainment system 238, a key fob (not shown) associated with the vehicle 102, and/or the like. The processor 244 may obtain the command signal or the request from the transceiver 242 and may determine that the trigger event may have happened responsive to obtaining the command signal/request from the transceiver 242.

Responsive to determining that the trigger event may have happened, the processor 244 may transmit a command to the BCM 220 to cause the air flow unit 240 to blow the pressurized air into the mat interior portion. Specifically, responsive to determining that the trigger event may have happened, the processor 244 may cause, via the BCM 220, the air flow unit 240 to activate, the first valve 312 to move to the closed position, and the second valve 314 and third valve 316 to move to the open positions.

Responsive to activating the air flow unit 240, the air flow unit 240 may begin to generate pressurized air. Since the first valve 312 may be in the closed position, the pressurized air may not enter the vehicle intake manifold 310 (via the air cooler 308). Further, since the second valve 314 may be in the open position, the pressurized air generated by the air flow unit 240 may move towards the mat interior portion via the pneumatic tube 318 and the mat left edge. The pressurized air may then flow through the mat body along the mat length and exit the mat interior portion to ambient environment via the exhaust tube 320 (since the third valve 316 may be in the open position), as shown by an arrow 322 in FIG. 3.

When the pressurized air may be flowing through the mat body along the mat length and underneath the top wall 110, ambient air above the top wall 110 may be pulled or sucked into the mat interior portion due to Venturi effect, as shown by arrows 324 in FIG. 3. The ambient air being pulled into the mat interior portion may also bring in the debris, dust, sand, etc. that may be disposed on the shoes 106, thereby facilitating shoe cleaning. The ambient air with the debris may enter the mat interior portion and may get pushed towards the exhaust tube 320 by the flow of pressurized air entering into the mat interior portion via the pneumatic tube 318. The exhaust tube 320 may then output the ambient air with the debris to the ambient environment, where the debris may be collected in a trash bag or dropped on the ground. In this manner, the processor 244 may enable shoe cleaning by controlling operation of the air flow unit 240 and the first, second, and third valves 312, 314, and 316.

As described above, the vehicle sensory system 232 may be further configured to detect an amount of debris disposed on the object/shoes 106 and the geographical area condition (e.g., road condition) associated with the geographical area where the vehicle 102 may be located. When the shoes 106 may be placed on the mat 108 or the user 104 may be standing on the mat 108 wearing the shoes 106, the processor 244 may obtain the inputs from the vehicle sensory system 232. The processor 244 may further obtain the weather condition information associated with the geographical area where the vehicle 102 may be located from the server 204.

In some aspects, the processor 244 may be configured to control an air flow unit operation (e.g., operation time duration, duty cycle, power, etc.) based on the inputs obtained from the vehicle sensory system 232 and the weather condition information obtained from the server 204. As an example, the processor 244 may determine an amount of debris disposed on the shoes 106 based on the inputs obtained from the vehicle sensory system 232 when the shoes 106 may be placed on the mat 108 and the mat 108 may be sucking or drawing the debris into the mat interior portion (as described above), and the processor 244 may control the air flow unit operation based on the determined amount of debris. Specifically, the processor 244 may determine an optimum time duration to operate/activate the air flow unit 240 based on the amount of debris disposed on the shoes 106. For example, the processor 244 may activate the air flow unit 240 for a time duration till no debris may be left on the shoes 106 (determined based on the inputs obtained from the vehicle sensory system 232).

The processor 244 may further determine the optimum time duration to operate/activate the air flow unit 240 based on the road condition on which the vehicle 102 may be located and/or the weather condition information. As an example, when the road condition indicates that the road may be dusty, muddy or may have a thick layer of snow, the processor 244 may operate/activate the air flow unit 240 for a longer time duration, as the shoes 106 may be more dirty or may have more debris when the user 104 walks on such a road. As another example, when the weather condition information indicates that it may be snowing or raining, the processor 244 may operate/activate the air flow unit 240 for a longer time duration.

In further aspects, the processor 244 may determine an optimum air pressure of the pressurized air output by the air flow unit 240 and entering into the mat interior portion based on the amount of debris disposed on the shoes 106, the road condition and/or the weather condition information. The processor 244 may further control the air flow unit operation and/or valve operation based on the determined optimum air pressure. For example, the processor 244 may increase the pressure associated with the pressurized air when the amount of debris disposed on the shoes 106 may be high. As another example, the processor 244 may increase the pressure associated with the pressurized air when the road condition indicates that the road may be dusty, muddy or may have a thick layer of snow. As yet another example, the processor 244 may decrease the pressure and/or decrease a time duration to operate the air flow unit 240 when the road may be clean (with no or minimal dust) and/or the weather condition information indicates clear weather in the geographical area where the vehicle 102 may be located.

Although the description above describes an aspect where the processor 244 controls the air flow unit operation based on the amount of debris on the shoes 106, the road condition and/or the weather condition information, in further aspects, the processor 244 may control the air flow unit operation based on a shoe size. For example, the processor 244 may decrease the air flow unit operation time duration and/or the air pressure when the shoe size may be small. In further aspects, the air flow unit operation time duration may be timer-based (i.e., may operate for a fixed time duration), and the operation time duration may be customizable/adjustable by the user 104.

In some aspects, the processor 244 may further enable the mat 108 to self-clean when the processor 244 determines that one or more through-holes 118 may be clogged (based on the inputs obtained from the vehicle sensory system 232), or when the processor 244 obtains a request from the user 104 to clean the mat 108. In some aspects, the user 104 may transmit the request to clean the mat 108 to the transceiver 242 via the user device 202 or the infotainment system 238. The processor 244 may obtain the request from the transceiver 242.

Responsive to obtaining the request from the user 104 or determining itself that one or more through-holes 118 may be clogged, the processor 244 may activate a mat cleaning mode. In this mode, the processor 244 may first transmit an audible and/or visual notification to the user 104 (via the user device 202 and/or the infotainment system 238), requesting the user 104 to move away from the mat 108. The processor 244 may then transmit a command signal to the BCM 220 and cause the first valve 312 and the third valve 316 to close and the second valve 314 to open. The processor 244 may further activate the air flow unit 240.

Responsive to activating the air flow unit 240, the air flow unit 240 may generate the pressurized air. Since the first valve 312 may be closed, the pressurized air may not flow towards the vehicle intake manifold 310. Further, since the second valve 314 may be open, the pressurized air may flow into the mat interior portion via the pneumatic tube 318 and the mat left edge. Furthermore, since the third valve 316 may be closed, the pressurized air may not exit into the ambient environment via the exhaust tube 320. Instead, in this case, the pressurized air may exit into the ambient environment via the plurality of through-holes 118 (as shown by arrows 402 in FIG. 4), thereby unclogging and cleaning the mat 108. In this manner, the processor 244 enables mat cleaning by using the same air flow unit 240 that is used to clean the shoes 106.

Figure 5:
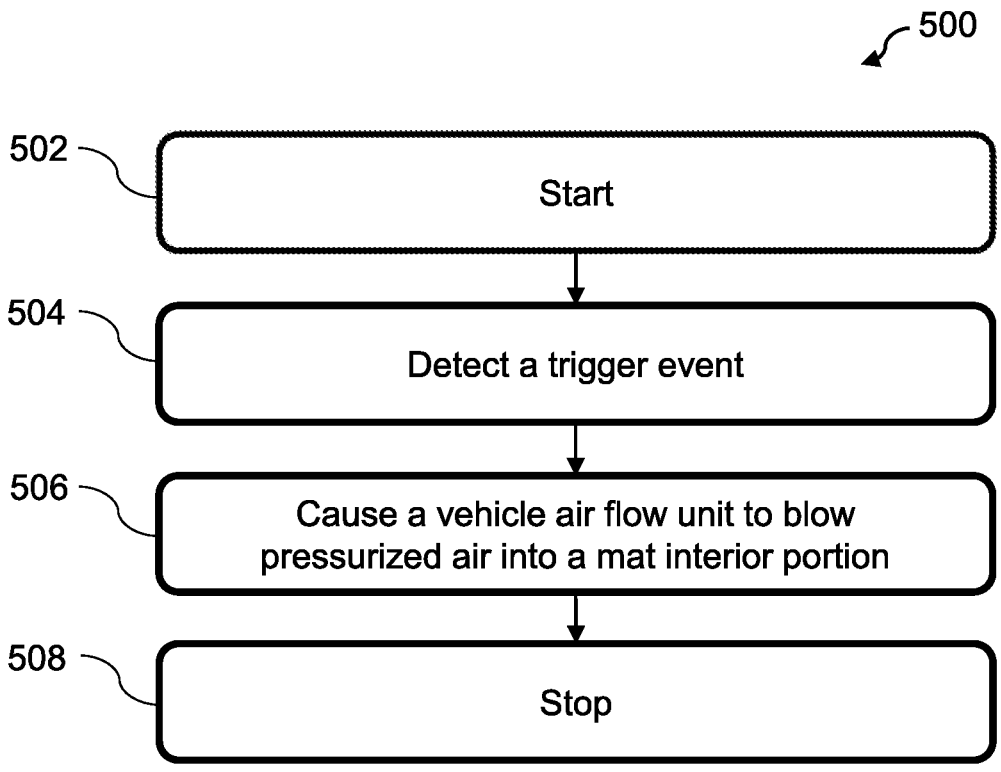
FIG. 5 depicts a flow diagram of a cleaning method in accordance with the present disclosure.

FIG. 5 depicts a flow diagram of an example object cleaning method 500 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include detecting, by the processor 244, that the trigger event may have happened. As described above, the processor 244 may detect that the trigger event may have happened when the processor 244 determines the object presence (e.g., shoe presence) on the top wall 110. The processor 244 may further detect that the trigger event may have happened when the processor 244 obtains the command signal or the request from the user 104 to clean the shoes 106 by using the mat 108.

At step 506, the method 500 may include causing, by the processor 244, the air flow unit 240 to blow the pressurized air into the mat interior portion to enable shoe cleaning by the mat 108, responsive to detecting that the trigger event may have happened, as described above.

The method 500 may end at step 508.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a mat comprising a top wall, a bottom wall and plurality of through-holes disposed in the top wall;
an air flow unit configured to blow pressurized air in a mat interior portion, wherein the pressurized air is blown parallel to a mat plane; and
a processor communicatively coupled with the air flow unit, wherein the processor is configured to:
detect a trigger event; and
cause the air flow unit to blow the pressurized air in the mat interior portion responsive to detecting the trigger event,
wherein ambient air in proximity to the top wall is pulled towards the mat interior portion via the plurality of through-holes when the air flow unit blows the pressurized air in the mat interior portion.

2. The vehicle of claim 1, wherein the air flow unit is part of a vehicle turbocharger system.

3. The vehicle of claim 1 further comprising a sensor unit configured to:
detect a presence of a user in proximity to the vehicle;
detect a presence of an object on the top wall;
detect an amount of debris disposed on the object; and
detect a geographical area condition associated with a geographical area where the vehicle is located.

4. The vehicle of claim 3, wherein the object is a user shoe.

5. The vehicle of claim 3 further comprising a light unit disposed in proximity to the mat, wherein the processor is further configured to:
obtain inputs from the sensor unit;
determine a user presence in proximity to the vehicle based on the inputs; and
cause the light unit to illuminate responsive to determining the user presence.

6. The vehicle of claim 3, wherein the processor is further configured to:
obtain inputs from the sensor unit; and
determine an object presence on the top wall based on the inputs, wherein the processor detects the trigger event when the processor determines the object presence on the top wall.

7. The vehicle of claim 6, wherein the processor is further configured to:
determine at least one of the amount of debris disposed on the object and the geographical area condition based on the inputs, responsive to determining the object presence on the top wall;
determine at least one of an optimum time duration to blow the pressurized air in the mat interior portion and an optimum air pressure associated with the pressurized air based on at least one of the amount of debris and the geographical area condition; and cause the air flow unit to blow the pressurized air in the mat interior portion based on the at least one of the optimum time duration and the optimum air pressure.

8. The vehicle of claim 1 further comprising:

a pneumatic tube connecting the mat interior portion and the air flow unit, wherein the pneumatic tube is configured to transfer the pressurized air from the air flow unit to the mat interior portion such that the pressurized air blows parallel to the mat plane; and a first valve disposed in the pneumatic tube between the air flow unit and the mat interior portion, wherein the first valve enables a flow of pressurized air from the air flow unit to the mat interior portion when the first valve is open, and wherein the first valve disables the flow of pressurized air from the air flow unit to the mat interior portion when the first valve is closed.

9. The vehicle of claim 8, wherein the processor causes the air flow unit to blow the pressurized air in the mat interior portion by activating the air flow unit and causing the first valve to open.

10. The vehicle of claim 8 further comprising an exhaust tube connected with the mat interior portion and a second valve disposed in the exhaust tube, wherein the exhaust tube is configured to output the pressurized air to ambient environment when the second valve is open, and wherein the exhaust tube is configured to disable exhaust of the pressurized air to the ambient environment when the second valve is closed.

11. The vehicle of claim 10, wherein the pressurized air exits to the ambient environment via the plurality of through-holes when the second valve is closed.

12. The vehicle of claim 10, wherein the processor is further configured to:

obtain a request from a user to clean the mat;

cause the second valve to close and the first valve to open responsive to receiving the request; and cause the air flow unit to blow the pressurized air in the mat interior portion responsive to causing the second valve to close and the first valve to open.

13. The vehicle of claim 1, wherein the processor is further configured to obtain a command signal from a user device or a key fob associated with the vehicle, and wherein the processor detects the trigger event when the processor obtains the command signal.

14. The vehicle of claim 1, wherein the mat interior portion is hollow.

15. The vehicle of claim 1, wherein the mat is disposed in a vehicle interior portion.

16. The vehicle of claim 1, wherein the mat is disposed in a vehicle exterior portion comprising at least one of a step bar, a bumper, and a cargo bed.

17. An object cleaning method comprising:

detecting, by a processor, a trigger event; and causing, by the processor, an air flow unit of a vehicle to blow pressurized air in a mat interior portion of a mat responsive to detecting the trigger event, wherein:

the mat comprises a top wall, a bottom wall and plurality of through-holes disposed in the top wall;

the air flow unit is configured to blow pressurized air in the mat interior portion parallel to a mat plane; and ambient air in proximity to the top wall is pulled towards the mat interior portion via the plurality of through-holes when the air flow unit blows the pressurized air in the mat interior portion.

18. The object cleaning method of claim 17 further comprising determining an object presence on the top wall based on inputs obtained from a sensor unit, wherein detecting the trigger event comprises determining the object presence on the top wall.

19. The object cleaning method of claim 17 further comprising obtaining a command signal from a user device or a key fob associated with the vehicle, wherein detecting the trigger event comprises obtaining the command signal.

20. A non-transitory computer-readable storage medium having instructions stored thereupon which, when executed by a processor, cause the processor to:

detect a trigger event; and cause an air flow unit of a vehicle to blow pressurized air in a mat interior portion of a mat responsive to detecting the trigger event, wherein:

the mat comprises a top wall, a bottom wall and plurality of through-holes disposed in the top wall;

the air flow unit is configured to blow pressurized air in the mat interior portion parallel to a mat plane; and ambient air in proximity to the top wall is pulled towards the mat interior portion via the plurality of through-holes, when the air flow unit blows the pressurized air in the mat interior portion.

\* \* \* \* \*